United States Patent

[11] 3,604,842

[72] Inventor Leopold Albert Harwood
Somerville, N.J.
[21] Appl. No. 822,951
[22] Filed May 8, 1969
[45] Patented Sept. 14, 1971
[73] Assignee RCA Corporation

[54] AUTOMATIC CHROMA CONTROL CIRCUITS
10 Claims, 3 Drawing Figs.

[52] U.S. Cl. .......... 178/5.4 AC, 331/20, 331/116 R
[51] Int. Cl. .......... H04n 9/48
[50] Field of Search .......... 178/5.4 AC, 69.5 CB, 5.45 Y; 331/20, 116 R

[56] References Cited
UNITED STATES PATENTS

| | | | |
|---|---|---|---|
| 3,070,654 | 12/1962 | Macovski .......... | 178/5.4 AC |
| 2,890,272 | 6/1959 | Macovski .......... | 178/5.4 AC |

*Primary Examiner*—Robert L. Griffin
*Assistant Examiner*—Donald E. Stout
*Attorney*—Eugene M. Whitacre

ABSTRACT: Automatic chroma control circuitry employs a peak detector circuit, operated from a chroma oscillator configuration, which oscillator exhibits a varying amplitude response determined by a narrow band filter included in an AC feedback path for the oscillator and arranged to selectively filter signal frequencies within the narrow band-pass as coupled thereto during the oscillatory burst interval. The band-pass filtered signals, including noise components serving to vary the peak amplitude of the oscillator cause the detector to provide at an output a control voltage proportional to the highest peak of the oscillator. This control voltage is applied to a chroma amplifier stage for varying the gain in accordance with varying oscillator amplitude.

Figure 1:
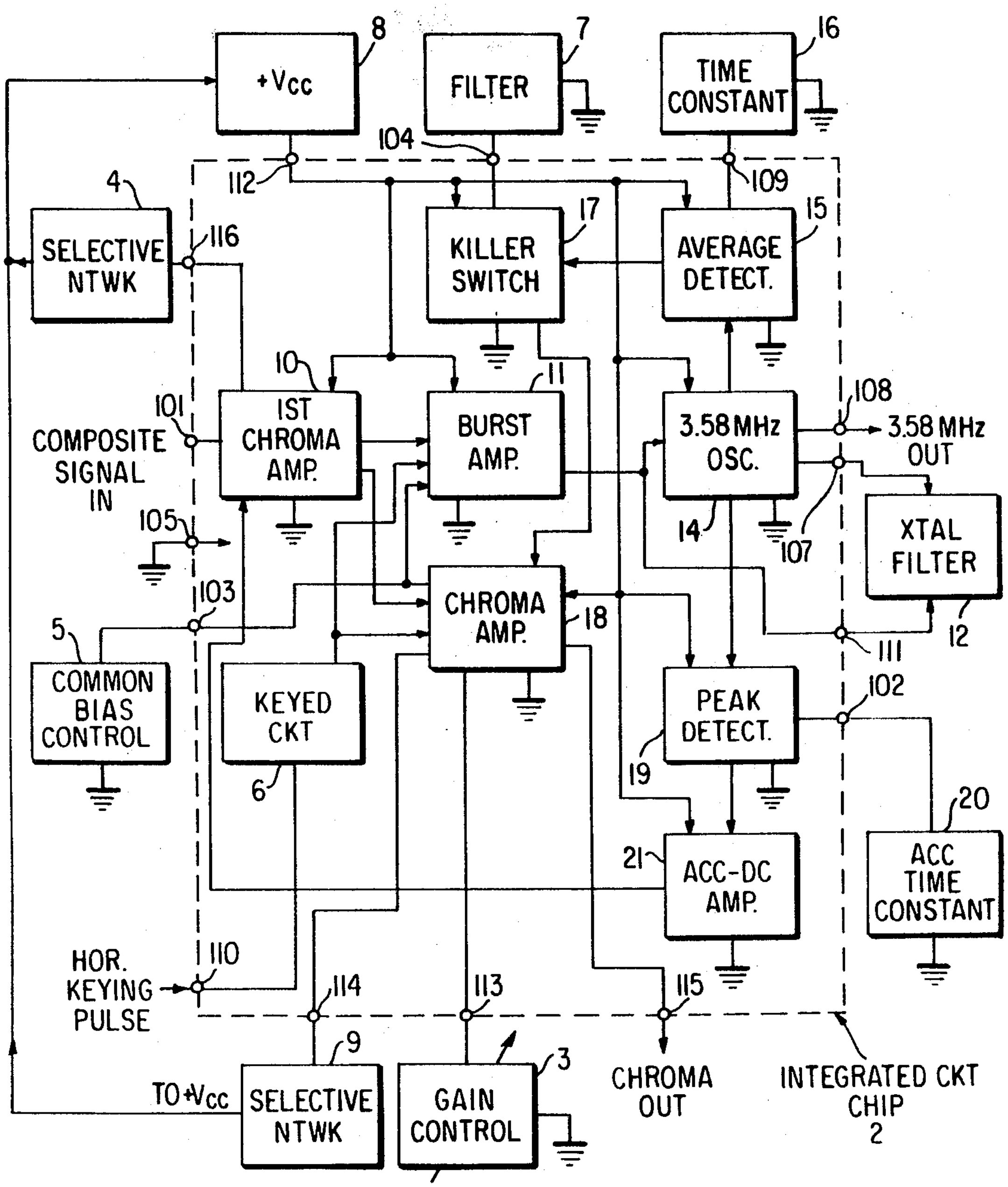

INVENTOR
Leopold Albert Harwood
BY Eugene M. Whitacre
ATTORNEY

INVENTOR
Leopold Albert Harwood

BY Eugene M. Whitacre

ATTORNEY

INVENTOR
Leopold Albert Harwood

BY Eugene M. Whitacre
ATTORNEY

AUTOMATIC CHROMA CONTROL CIRCUITS

This invention relates, in general, to chroma signal processing circuitry and more particularly to automatic chroma control circuitry for use in a color television receiver, such circuitry being conveniently realizable in integrated circuit form.

Automatic chroma control or ACC has found relatively wide application in the environment of the color television receiver.

ACC is desirable as due to various propagation path changes, and other factors, the higher frequency chroma components are subjected to different amplitude variations than lower frequency information components of the composite signal. Automatic gain control, or AGC, associated with most receivers, is not sufficient to fully compensate for such selective variations in the chroma signal components.

Associated with the selective variation of the chroma components is the further problem of noise interference. Noise accompanies any signal, and can be introduced by various well known phenomena.

Signals processed by a television receiver are subjected to many different noise sources. In poor signal areas thermal noise generated, within the receiver, by the various front end components, becomes an important factor. This is so, as the magnitude of the received signal, in such an area, may be comparable with the magnitude of the thermal noise generated internally.

Many prior art automatic chroma control circuits employ a detector which provides at an output, a voltage proportional to the average amplitude of color bursts contained in the composite signal and transmitted during a color transmission. An average detector, having a relatively long time constant, serves to integrate out the random effects of noise, and provides an output voltage which is relatively noise immune, and is therefore primarily dependent upon the amplitude of the burst signal.

A selective reduction in the chroma signal is corrected by a suitable ACC servo loop so as to maintain a desired chroma signal output level in the receiver. However, noise is amplified along with the chroma signal, and the combined output signal, including the noise, may still exceed the dynamic range of the chroma channel as determined, for example, by the demodulators, subsequent chroma amplifiers or the color kinescope. In prior art techniques where an average detector is used for ACC control the output voltage level is independent of noise and therefore such detectors ignore the fact that the actual dynamic range of the chroma channel is exceeded. The resultant effect may produce a color display on the face of the kinescope which is substantially affected by the undesired noise components. Such color displays appear over or under saturated in a relatively random distribution over the face of the kinescope. The overall result to the picture, perhaps, can be best described in terms like splotchy or blotty display presentations. Such displays, characterized by the presence of noise, can be completely undesirable for presentation to the consumer or viewer.

It is therefore an object of the present invention to provide an improved automatic chroma control circuit, which is also adaptable to integrated circuit fabrication techniques, exhibiting improved operation with noisy signals.

An embodiment of the present invention employs a filter network having a relatively narrow frequency response characteristic, sufficient to permit propagation therethrough of signal frequencies, including noise components, about the chrominance subcarrier frequency included in a composite television signal. The filter network, is included in an AC feedback path of an oscillator circuit and provides AC feedback to the oscillator circuit of a sufficient magnitude for determining the frequency of oscillation. The filter also serves to selectively propagate the burst signal and other components including noise occurring during the burst interval associated with the composite signal. This prefiltered signal injection locks the oscillator and serves to vary the amplitude of the oscillator signal in accordance with the magnitude of the injected signal. A detector circuit is responsive to the varying magnitude oscillator signal for providing at an output a control voltage having a magnitude proportional to the highest peak amplitude of the oscillator signal, including any peak amplitude as produced by noise or burst components. A gain controllable amplifier in the chrominance processing path is coupled to the output of the detector, which varies the gain of the amplifier in accordance with the peak value of the varying amplitude oscillator signal.

Figure 2:
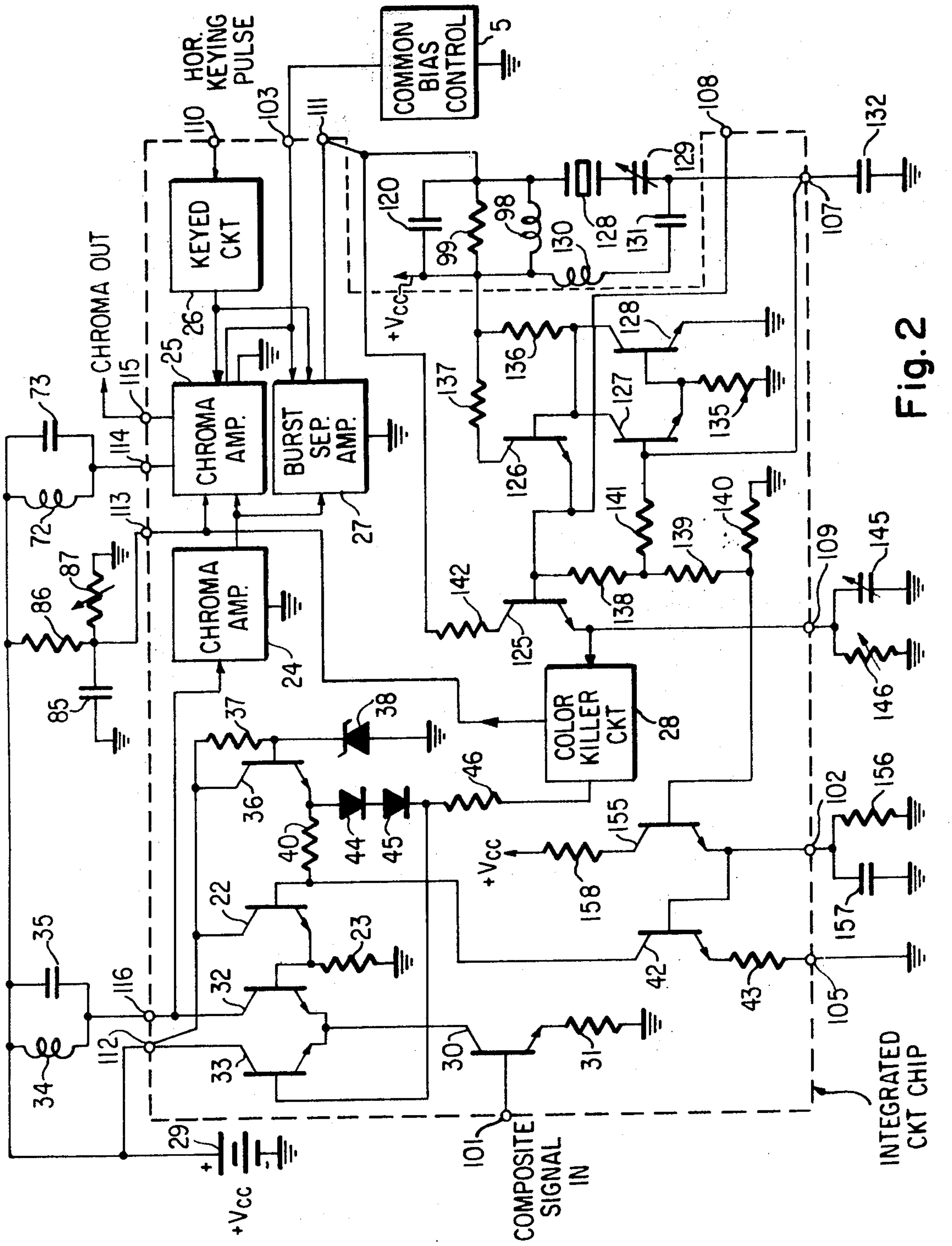
Figure 3:
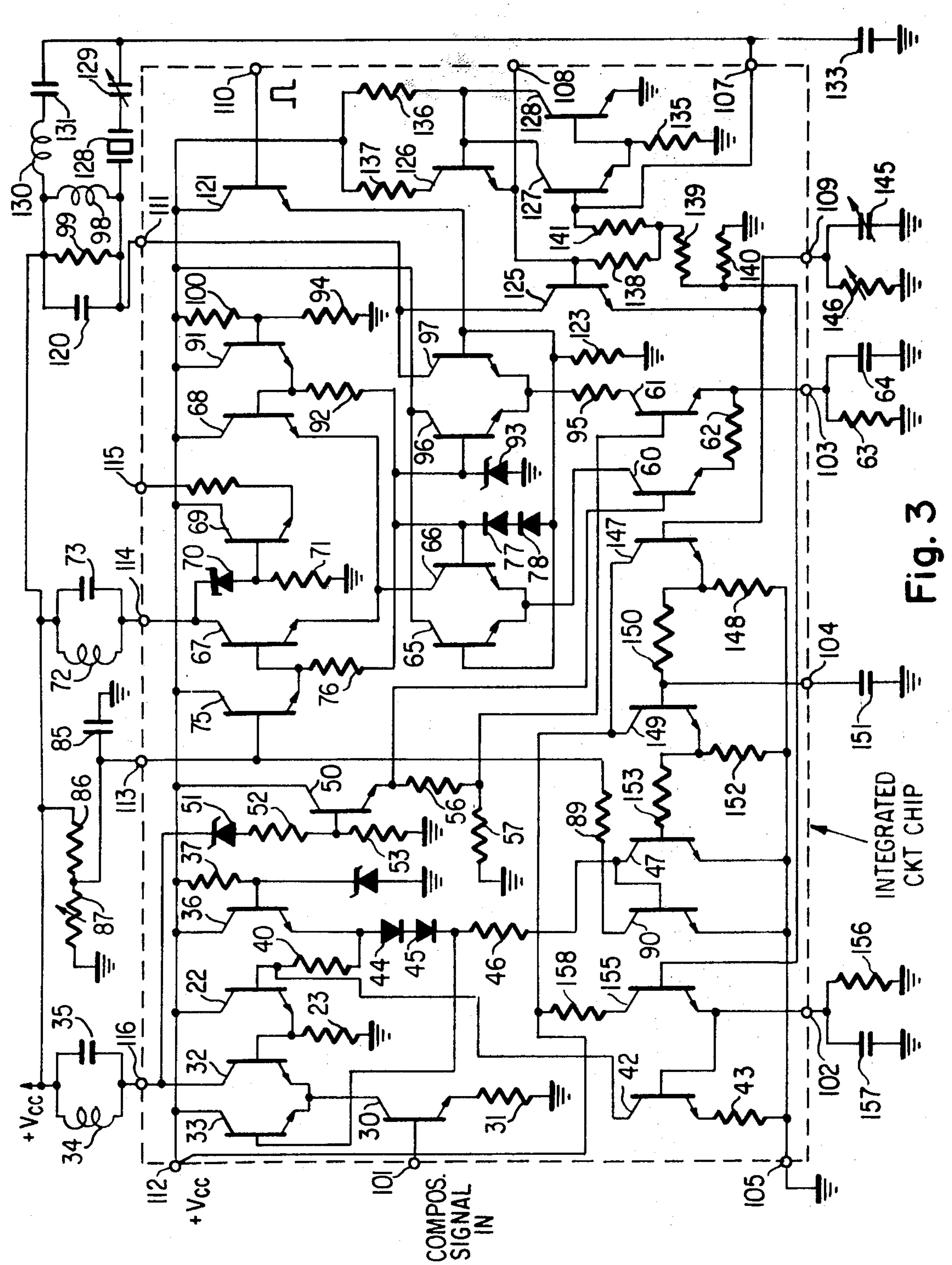

Other objects and advantages of the present invention will be readily apparent to those skilled in the art upon a reading of the following detailed description and an inspection of the accompanying drawings in which:

FIG. 1 provides a block diagram illustration of a chroma processing circuitry, included in a television receiver, employing an ACC circuit arrangement operating in accordance with the principles of the present invention;

FIG. 2 is a more detailed schematic representation, partially in block diagram form, of the processing circuitry included in FIG. 1; and FIG. 3 illustrates a detailed schematic circuit diagram of the chroma processing circuitry included on an integrated circuit substrate together with a more detailed inclusion of off-chip components, illustrated in schematic detail for use with the chroma processing integrated circuit chip.

In FIG. 1 a portion of a color television receiver embodying the principle of the present invention is illustrated in simplified block diagram form. A composite video signal is applied to an input terminal 101 of an integrated circuit chip 2. The circuitry of the chip 2 includes a first chroma amplifier 10 which responds to the signal delivered to terminal 101 and delivers an amplified version thereof at an output coupled to an input of a burst amplifier 11 and a chroma amplifier 18. Selective networks 4 and 9 are externally connected to terminals 116 and 114 for providing chroma selectivity for the first chrominance amplifier 10 and chroma amplifier 18. The burst amplifier 11 is keyed during a horizontal synchronizing interval by means of a keyed circuit 6 having an input terminal 110 for application thereto of a horizontal keying pulse. The keyed circuit 6 activates the burst amplifier 11 during the horizontal retrace interval, and serves to disable the chroma amplifier 18 during the same interval. The output of the burst amplifier 11 is filtered by a narrow band crystal filter 12 also coupled external to the integrated circuit chip 2 and located between an output terminal 111 of the burst amplifier, and an input terminal 107 associated with a chroma subcarrier oscillator 14. Oscillator 14 includes the crystal filter network 12 in a feedback loop and provides a continuous wave output signal at terminal 108 which is locked in phase and frequency with the incoming burst signal, when present.

An output of the oscillator 14 is applied to an input of an average detector 15 used for color killer detection. The output of the average detector 15 has coupled thereto, via terminal 109, an appropriate time constant circuit 16 used for ACC and color killer threshold adjustments. An output of the average detector 15 is coupled to a killer switch circuit 17 included on the integrated circuit substrate. The killer switch circuit 17 has a terminal 104 for connection thereto of an appropriate external filter element 7 for reducing chrominance subcarrier coupling. An output of the killer switch circuit 17 is applied to an input of the chroma amplifier 18 for disabling the chroma channel during a monochrome transmission. An output from the chroma amplifier 18 is coupled to a terminal 115 for application of chroma signals to color demodulator stages, not shown.

A second output from the oscillator 14 is applied to an input of a peak detector circuit 19 which is utilized for ACC control. The peak detector 19 is associated with a suitable time constant network 20, externally coupled to terminal 102 on the integrated circuit assembly. Peak detector 19 provides at an output a control voltage proportional to the peak value of the oscillator signal.

A burst signal, gated at the horizontal line rate is applied to the crystal filter 12, via the burst separator or amplifier 11 as coupled to terminal 111. The information stored in the crystal during this interval affects the amplitude and phase of the oscillator 14 signal for the duration of one horizontal line. A capacitance associated with the ACC time constant network 20 charges to the peak value representative of the oscillator signal. Accordingly, as will be further described, the detected signal level for ACC control is proportional to the peak value of the oscillator signal as effected by the injected burst and associated noise components. This peak detected voltage is applied to a DC amplifier 21 having an output coupled to the first chroma amplifier 10 to control the gain thereof, such that the chroma signal level output is controlled as determined by the peak amplitude detected oscillator signal.

The integrated circuit chip 2 further includes a terminal 112 for the application thereto of a suitable operating potential designated as $+V_{cc}$ and obtained from a conventional source 8. A ground terminal 105 to provide a common reference potential for the integrated circuit chip 2 is also provided. The chroma processing integrated circuit chip 2 further includes a terminal 113 coupled to a variable gain control circuit 3 which will be further described subsequently.

Referring to FIG. 2 there is shown a schematic diagram partially in block form of an integrated circuit configuration capable of performing chroma processing including an ACC loop according to this invention. In FIG. 2 the average detection for color killing is provided for within the oscillator circuit by a unique configuration described in greater detail subsequently and further described in a copending application entitled "OSCILLATOR CIRCUITS" Ser. No. 823,066, filed on May 8, 1969, and assigned to the same assignee.

A composite television signal is applied to terminal 101 coupled to the base electrode of a first chroma amplifier stage including a transistor 30 having its emitter electrode returned to ground, through a resistor 31. Transistor 30 forms part of a totem pole or cascode amplifier, further comprising a transistor 32 having its emitter electrode coupled to the collector electrode of transistor 30. The collector electrode of transistor 32 is coupled to terminal 116 on the integrated circuit substrate. A parallel resonant tank circuit comprising inductor 34 and capacitor 35 is coupled between terminal 116 and a source of operating potential 29, designated as $+V_{cc}$ and connected to the terminal 112.

The parallel resonant tank has a frequency band-pass characteristic encompassing the chrominance subcarrier and a portion of the sideband frequency range and serves to provide the bandwidth selection for the composite signal as amplified and applied to terminal 116. A biasing network forming part of the ACC control loop, is referenced from a follower transistor 36 having the base electrode coupled to a voltage reference source comprising resistor 37 in series with a reference diode or Zener diode 38. The junction between resistor 37 and Zener diode 38 is coupled to the base electrode of the follower transistor 36. The emitter electrode of the follower transistor 36, is coupled to the base electrode of a bias follower transistor 22 through a resistor 40. Transistor 22 has the emitter electrode coupled to the base electrode of transistor 32 for providing operating bias thereto, and has an emitter shunt resistor 23 coupled to a point of reference potential, such as ground. Transistor 32 is further current controlled and gain controlled by means of a transistor 33, arranged in a follower configuration, and having the emitter electrode connected directly to the emitter electrode of transistor 32. The base electrode of transistor 33 is referenced back to the emitter electrode of transistor 36 through the series diodes 44 and 45. The diodes 44 and 45 are maintained in forward conduction during a color transmission by means of a resistor 46 coupled between a color killer circuit 28, as will be further described, and the junction between the diodes and the base electrode of transistor 33. An ACC control voltage is applied between the junction of the base electrode of transistor 22 and resistor 40 by means of transistor 42, having the collector electrode coupled to said junction.

The amplified chrominance signal appearing at terminal 116 is applied to the input of a second chroma amplifier 24 which drives a chroma amplifier stage 25 and a burst separator amplifier 27. Further selectivity for the chroma signals is provided by an external tank circuit comprising inductor 72 and capacitor 73, which are also selected to resonate, within the chrominance sideband frequency spectrum, and in conjunction with the aforementioned tank circuit (34, 35) provides the required selective band-pass characteristic for the chrominance frequencies. Chroma amplifier 25, as will be described in greater detail, is provided with a terminal 113 having a connection thereto of an external gain control circuit for manual operation, comprising resistors 86 and 87 and capacitor 85.

An output chrominance signal from amplifier 25 is available at terminal 115 for application to suitable demodulator circuits, now shown. Burst separation is provided for by keying the burst separator amplifier 27 by means of a keyed circuit 26 activated by a horizontal keying pulse applied to terminal 110. The keying pulse as processed by the keying circuit 26 is also applied to the chroma amplifier 25 for elimination of burst from signals applied to the demodulator during the burst retrieval.

The burst separator amplifier 27 has a selective frequency load, externally connected at the feedback output terminal 111, comprising the parallel combination of inductor 98, resistor 99 and capacitor 120. The parallel resonant circuit is coupled between the $+V_{cc}$ supply and terminal 111 and is selected to provide a fairly broad frequency response about a center frequency of approximately 3 MHz. The parallel resonant circuit is also included in the 3.58 MHz. oscillator feedback path as will be explained subsequently. As keyed during the horizontal interval, the burst separator amplifier 27 provides at terminal 111 an amplified version of the oscillatory burst representative of the chroma subcarrier frequency as utilized at the transmitter, and necessary for demodulation purposes. The amplified burst signal appearing at terminal 111 is then applied to a narrow band crystal 128 having a resonant frequency about the chrominance subcarrier (3.58 MHz.). The exact resonant frequency is further determined by a variable capacitor 129, coupled in series with the crystal 128 between the feedback output terminal 111 and the terminal 107, or input terminal to a chroma oscillator circuit.

The chroma oscillator circuit basically comprises an amplifier stage including transistors 126, 127 and 128 and a limiter stage including transistor 125. Transistors 127 and 128 are arranged in a beta-multiplication circuit, sharing a common collector connection and having the base electrode of transistor 128 driven from the emitter electrode of transistor 127. The emitter electrode of transistor 127 is further referenced to ground through a resistor 135. A common collector load for transistors 127 and 128 is provided by resistor 136 coupled between the common collector point and the $+V_{cc}$ supply terminal. The beta-multiplication circuit, thusly formed, permits low base currents to flow through the base to emitter junction of transistor 127, while obtaining relatively high amplification for transistors 127 and 128. The low base current operation provides DC stabilization with temperature variations for the oscillator, as well as for voltage changes which are normally beta sensitive. A DC feedback amplifier, to further assure overall oscillator stability includes transistor 126 having the collector electrode coupled to the $+V_{cc}$ supply via resistor 137. The emitter electrode of transistor 126 is referenced to ground through the series load comprising resistors 138, 139 and 140. The DC feedback for the oscillator is provided by resistor 141 coupled between the junction of resistors 138 and 139, and the base electrode of transistor 127. The junction between the base electrode of transistor 127 and resistor 141 is coupled to terminal 107 used as an input terminal to complete the AC feedback path for the oscillator. The configuration, thus described, because of the feedback ratio and the large open loop gain of the amplifier assures low input impedance for the oscillator circuit as seen looking into terminal 107. The low impedance permits the resonant circuit comprising the crystal 128 and capacitor 129 to operate relatively frequency independent of the characteristics of the transistors utilized therewith.

Transistor 126 has a collector electrode returned to $+V_{cc}$ via the current limiting resistor 137. The emitter electrode of transistor 126 is further coupled to the base electrode of the limiting transistor 125. Transistor 125 serves as part of the oscillator circuit and serves to provide approximately an additional 180° phase shift necessary to assure oscillations. Transistor 125 also serves, as indicated above to provide average detection, while an adjustable RC emitter circuit provides killer and ACC threshold adjustment. The collector electrode of transistor 125 is coupled to terminal 111 via a current limiting resistor 142. The emitter electrode of transistor 125 is coupled to terminal 109 on the integrated circuit substrate. The external, adjustable RC network used for ACC and killer threshold adjustment is coupled between terminal 109 and a point of reference potential and comprises variable resistor 146 and variable capacitor 145. The emitter electrode of transistor 125 is also coupled to the input of the color killer circuit 28 for disabling the chroma amplifier 25 during a monochrome transmission and for providing a forward biasing current to diodes 44 and 45 via resistor 46 during a color transmission.

Referring back to the emitter path of transistor 126, used in the color oscillator configuration, a control signal for ACC is obtained by coupling the junction between resistors 139 and 140 to the base electrode of transistor 155 utilized for ACC detection. The emitter electrode of transistor 155 is coupled to terminal 102 on the integrated circuit assembly. An external time constant network for ACC operation comprises the shunt combination of resistor 156 and capacitor 157 and is coupled between terminal 102 and the point of reference potential. The collector electrode of transistor 155 is coupled to a point of operating potential via a current limiting resistor 158 used to protect the transistor 155 from drawing excessive current for the inadvertent application of improper potentials to terminal 102.

The ACC control loop is completed by transistor 42 having its base electrode coupled to the emitter electrode of transistor 155. The collector electrode of transistor 42 is coupled to the junction between the base electrode of transistor 22 and resistor 40 forming part of the biasing circuit for the first chroma amplifier stage.

The operation of the chroma processing circuitry including the ACC control loop will now be described. The composite signal as applied to terminal 101 is amplified by the cascode combination of transistors 30 and 32 and is confined to a predetermined bandwidth at terminal 116 due to the "Q" of the resonant circuit comprising inductor 34 and capacitor 35. The amplified signal appearing at terminal 116 is then coupled to the chroma amplifier 24 and applied therefrom to the chroma amplifier 25 and the burst separator 27. As is known in the prior art, it is preferable to blank the chroma channel during the burst period to prevent spurious products from being developed by subsequent demodulators because of coupling thereto of the burst signal.

Techniques to accomplish this are known in the prior art and ordinarily referred to as burst elimination or burst blanking. The chroma amplifiers are preferably energized during the major portion of the line interval and are blanked during the burst retrieval which occurs during the horizontal retrace interval. To accommodate burst retrieval and burst elimination, a horizontal keying pulse is applied to terminal 110 and thence to the keyed circuit 26. The keyed circuit 26 during the horizontal interval activates the burst separator 27 and disables the chroma amplifier 25. Accordingly, the burst frequency signals as bandwidth limited by inductor 98, resistor 99 and capacitor 120 appear at terminal 111.

The aforementioned tank circuit further serves to remove the horizontal retrace pulse frequencies from affecting the burst output. The amplified burst is coupled to the oscillator input terminal 107 via the crystal filter comprising crystal 128 and tuning capacitor 129. The oscillator, as previously described, is an injection locked type and thereby provides at the output (terminal 108) a signal which is synchronized to the amplified burst signal appearing at terminal 111. An important characteristic of the injection locked oscillator is the ability to respond properly to the burst signal. In the oscillator circuit described, the quiescent oscillator signal at the emitter electrode of transistor 126 is set to a first level (1½ volts peak to peak) by adjusting resistor 146 which sets the limit of the amplitude of oscillations. Upon application to transistor 127 of a three volt peak to peak burst signal applied to the crystal 128 at terminal 111, the oscillator signal increases at the emitter electrode of transistor 126 to approximately 4 volts peak to peak. This magnitude of change in amplitude (i.e. almost a three times change) enables the color killer circuit 28 to operate reliably while further permitting the amplifier associated with the oscillator to function within its linear dynamic range.

Accordingly, the amplitude of the oscillator during the presence of burst is a function of burst. The oscillator voltage appearing at the junction between resistor 139 and 140 is also representative of the peak amplitude of the oscillator signal as further determined by the prefiltered signal coupling through the relatively narrow band crystal 128. As indicated the amplitude of the oscillator signal is primarily dependent upon the burst, when present, and may vary in amplitude over a range of 3 to 1. Noise having frequency components within the band-pass of crystal 128 can also couple through if present during the burst interval. Therefore noise affects the amplitude of the oscillator depending on its frequency and phase in a similar manner as the oscillator is affected by the burst. Transistor 155 having the emitter electrode coupled to terminal 102 acts as a peak detector, in conjunction with resistor 156 and capacitor 157 coupled between terminal 103 and ground.

The voltage developed across the capacitor 157 is representative of the peak amplitude of the oscillator signal appearing at the junction between resistors 139 and 140 and the base electrode of transistor 155. The time constant afforded by resistor 156 and capacitor 157 is sufficient to maintain the peak amplitude of the oscillator signal detected at the beginning of the line for an entire field. Noise coupling through the crystal filter 128 can therefore charge the capacitor 157 to the peak value of the oscillator signal as controlled by noise pulses and burst signal when present. The positive voltage thusly developed across the capacitor 157 is coupled to the base electrode of transistor 42 having the collector electrode coupled to the junction between resistor 40 and the base electrode of the follower stage 22. As transistor 42 conducts there is less base current available for transistor 22 which in turn causes transistor 32 to decrease conduction thus reducing the gain.

Resistor 146 coupled to terminal 109 determines the maximum peak-to-peak voltage that can be conveniently accommodated by the oscillator. The setting of resistor 146 therefore determines the peak to peak swing available at the junction between resistors 139 and 140. There is a predetermined DC potential developed across capacitor 157 due to the quiescent amplitude of the oscillator which is of a magnitude determined by the setting of resistor 146. During the absence of the burst signal this voltage serves to reverse bias transistor 42. As the peak-to-peak amplitude of the oscillator signal increases because of noise coupling through the narrow band crystal, or because of the actual burst being present, the capacitor 157 charges to the peak value of the increased amplitude signal. As the voltage across the capacitor increases, transistor 42 begins to conduct diverting base current from transistor 22. The path for such diverted current is through the collector to emitter path of transistor 42 and resistor 43 to ground. The voltage at the base electrode of transistor 22 therefore decreases as does the emitter voltage which in turn reduces the bias and gain of transistor 32. Transistor 33, having the emitter electrode coupled to the emitter electrode of transistor 32, is biased at the base electrode by $2V_{be}$ less than the voltage at the emitter electrode of transistor 36. This $2V_{be}$ drop is afforded by the diodes 44 and 45 biased in conduction via resistor 46 coupled to the killer circuit 28. The bias at the base electrode of transistor 32 is approximately $1V_{be}$ down from the voltage at the emitter electrode of transistor 36 due to the drop across the base to emitter junction of transistor 22. Accordingly, the voltage at the emitter electrode of transistor 32, and therefore transistor 33, is $2V_{be}$ down from the referenced emitter electrode of transistor 36. This assures that initially transistor 33 is cutoff or reversed biased. As the chroma signal increases from zero transistor 42 begins to conduct causing the base voltage at transistor 22 to decrease. Transistor 32 approaches a reverse biased mode while transistor 33 tends to be forward biased. When the voltage drop across resistor 40 is equal to approximately $1V_{be}$, the gain of transistor 32 is decreased by a factor of ½ and equal currents flow through transistor 32 and 33. When the voltage at the emitter electrode of transistor 155 is approximately equal to 1 volt, full ACC corresponding to minimum gain of transistor 32 is provided. In the event of a weak composite signal which corresponds to a poor signal to noise ratio the gain of the chroma channel may be reduced due to the presence of the larger noise components. This operation tends to prevent the over saturation of the final display by assuring that the dynamic range of the chroma demodulators or the color kinescope or the following chroma amplifier stages as 24 and 25 is not exceeded. The overall action of the ACC circuitry serves to provide the viewer with a color display which is less saturated for weak noisy signals but is more appealing and pleasant for viewing purposes. Under relatively good signal conditions the amplitude of the oscillator is primarily dependent upon the amplitude of the burst signal and therefore variations of the burst amplitude will determine the voltage across capacitor 157. By performing peak detection of the magnitude of the chroma subcarrier oscillator, as noise and burst affected, after application of noise and burst components through the narrow band crystal filter, one serves to effectively measure the influence of noise as affecting the amplitude of the burst during the horizontal line. The tendency is to therefore maintain a desired ratio between the noise amplitude in relation to the overall chroma oscillator amplitude, by deriving a control voltage which is proportional to the burst amplitude as affected by the noise. A further feature of the described configuration is that excessive noise conditions will reduce the chroma gain and consequently serve to protect color killer operation. Even though the color killer circuit 28 is an average detector type; practically, it is slightly noise responsive. In this manner the color killer circuit 28 for large noise signal amplitudes during a monochrome transmission could improperly enable the chroma channel. This tendency is reduced, as the ACC detector, thusly described, will function to reduce the chroma gain during the presence of large noise signals.

If reference is made to FIG. 3 there is shown a complete integrated circuit assembly including the ACC control circuitry previously described, and further including the circuitry for the chroma amplifiers and color killer circuit shown in block form in FIG. 2.

The amplified chrominance signal as described appearing at terminal 116 is applied to the base electrode of a follower transistor 50 through the zener diode 51 in series with resistor 52. A resistor 53 is coupled from the base electrode of transistor 50 to ground and completes the drive and biasing network for transistor 50. Transistor 50 arranged in emitter follower configuration has a collector electrode coupled to terminal 112 ($+V_{cc}$) and has an emitter electrode returned to ground through the series load comprising resistors 56 and 57. Transistor 50 provides chroma drive and burst drive to a chroma amplifier transistor 60 and a burst amplifier transistor 61. The base electrode of transistor 60 is coupled to the junction between the emitter electrode of transistor 50 and resistor 56; and the base electrode of transistor 61 is coupled to the junction between resistors 56 and 57. The emitter electrode of transistor 60 is coupled to the emitter electrode of transistor 61 via a degenerating resistor 62. The junction between resistor 62 and the emitter electrode of transistor 61 is coupled to a terminal 103 on the integrated circuit assembly. A parallel RC network comprising a resistor 63 and a capacitor 64 is externally connected between terminal 103 and ground.

The chroma amplifier transistor 60 has a collector electrode coupled to the junction between the emitter electrode of transistors 65 and 66, forming part of a switchable differential stage. The collector electrode of transistor 66 is coupled to the junction between the emitter electrode of transistor 67 and 68 arranged in a differential amplifier configuration. Transistor 68 has the collector electrode coupled to terminal 112. Transistor 67 has the collector electrode coupled to the base electrode of the transistor 69, via a zener diode 70.

The junction between the anode of the zener diode 70 and the base electrode of transistor 69 is coupled to a point of reference potential through a resistor 71. The junction between the collector electrode of transistor 67 and the cathode of the zener diode 70 is coupled to terminal 114. A parallel resonant circuit comprising inductor 72 and capacitor 73 is externally connected between the integrated circuit assembly at terminal 114 and the $+V_{cc}$ supply. As indicated this selective network is responsive to chrominance frequencies and functions to provide further amplification to the chrominance signals as applied to the base electrode of transistor 60. A controllable biasing network for transistor 67 employs a follower transistor 75 having the emitter electrode coupled to the base electrode of transistor 67. Bias for transistor 66 is also obtained by coupling the emitter electrode of transistor 75 to the base electrode of transistor 66 via the resistor 76. The base electrode of transistor 65 is coupled to the base electrode of transistor 66 through the series combination of diodes 77 and 78. The base electrode of the follower transistor 75 is coupled to terminal 113 to which an external voltage divider comprising resistors 86 and 87 is also connected. The junction between resistors 86 and 87 is coupled to terminal 113, while the series combination of the resistors is coupled between the $+V_{cc}$ supply and a point of reference potential. The resistors 86 and 87 are selected to provide temperature tracking with the voltage divider comprising the onboard resistors 94 and 100 used for referencing the base electrode of the bias follower transistor 91. A capacitor 85 is connected between terminal 113 and a point of reference potential and serves as a decoupling element. A ground return path for the base electrode of transistor 75 is provided by a resistor 89 in series with the collector to emitter path of transistor 90 which is part of a color killer circuit as will be further described.

Reference biasing for transistor 68 is supplied by the follower biasing transistor 91 having a collector electrode connected to the $+V_{cc}$ bus and the emitter electrode directly coupled to the base electrode of transistor 68. A resistor 92 is coupled between the emitter electrode of transistor 91 and the base electrode of transistor 66. A reference potential for the base electrode of transistor 66 is supplied by the zener diode 93 coupled between the base electrode and the point of reference potential. The burst driver amplifier 61 has a collector electrode coupled through a current limiting resistor 95 to the junction between the emitter electrodes of another differential amplifier arrangement comprising transistors 96 and 97. The base electrode of transistor 96 receives an operating bias from the connection thereto of the junction between resistor 92 and the cathode of the zener diode 93. The collector electrode of transistor 96 is directly coupled to $+V_{cc}$ bus. Transistor 97 has the collector electrode coupled to terminal 111 of the integrated circuit chip. The external parallel resonant circuit comprising inductor 98, resistor 99 and capacitor 120 is selected to exhibit a fairly broad frequency response about 3 MHz. and is coupled between terminal 111 and the $+V_{cc}$ supply. The resonant circuit is used as part of the burst separator and output circuit. A keyed transistor 121 has a collector electrode coupled to the $+V_{cc}$ but (terminal 112) and an emitter electrode returned to ground through the series combination of resistors 122 and 123. The junction between resistors 122 and 123 is coupled respectively to the base electrodes of transistors 65 and 97. The base electrode of transistor 121 is directly coupled to terminal 110. In operation a horizontal keying pulse of a positive polarity is applied to terminal 110 as will be described subsequently.

The oscillator, as previously described in conjunction with FIG. 2, has an input terminal 107 coupled to the base electrode of transistor 127 and an output terminal 111. The crystal 128 in series with the tuning capacitor 129 is connected between terminal 107 and 111 to form part of the frequency determining network for the oscillator, as well as the selective burst filtering path. The crystal 128 and capacitor 129 are shunted by inductor 130 and capacitor 131 for neutralizing the crystal case capacitance. A capacitor 132 is coupled between terminal 107 and ground to stabilize the feedback amplifier by preventing any tendency for the oscillator to exhibit high frequency spurious oscillations. As previously described, the emitter electrode of transistor 125 is coupled to terminal 109 on the integrated circuit substrate. An external adjustable RC network used for ACC and killer threshold adjustments is coupled between terminal 109 and a point of reference potential and comprises the variable capacitor 145 and the variable resistor 146. The emitter electrode of transistor 125 is coupled to the base electrode of a follower transistor 147 used in the color killer circuit. The emitter electrode of transistor 147 is returned to reference potential through resistor 148 and is also coupled to the base electrode of a follower transistor 149 through resistor 150. The junction between the base electrode of transistor 149 and resistor 150 is coupled to terminal 104 on the integrated circuit substrate. Terminal 104 has connected thereto a terminal of a filter capacitor 151, having a second terminal connected to ground. Capacitor 151, serves to bypass high frequency signals to ground and further determines the killer circuit time constant. The emitter electrode of transistor 149 is returned to ground via resistor 152 and is coupled through resistor 153 to the base electrode of transistor 47.

Transistor 47 is utilized in common emitter amplifier configuration and forms part of a killer switch circuit. Coupling of the collector electrode of transistor 47 to diodes 44 and 45 through resistor 46 serves as a supply of operating bias current for forward biasing the diodes 44 and 45. The collector electrode of transistor 47 is also coupled to the base electrode of transistor 90 forming the final stage for color killer operation and completing the color killer switch. As previously described in conjunction with FIG. 2, the control signal for ACC is obtained by coupling the junction between resistors 139 and 140 located in the emitter path of transistor 126, of the color oscillator configuration, to the base electrode of the peak detector transistor 155.

The operation of the integrated circuit assembly containing the above described components connected in the above described configuration will now be explained with particular emphasis on the operation and unique combinations of the components included in FIG. 3 and not particularly described in the preceding figures.

The composite signal, as applied to terminal 101, is amplified by the cascode combination of transistors 30 and 32, and is confined to a predetermined bandwidth at terminal 116, due to the "Q" of the resonant circuit, comprising inductor 34 and capacitor 35. The amplified signal is applied to the base electrode of transistor 50 via the zener diode 51 and resistor 52. This coupling scheme via terminal 116 to the base electrode of transistor 50 is particularly interesting as utilization of the zener diode 51 affords the conservation of terminals on the integrated circuit assembly.

In discrete approaches, the coupling between a transistor amplifier having an inductance as part of a collector load, may be accomplished by a capacitor which would couple from the collector electrode of the amplifier to the base electrode of the following stage, or by a transformer having a primary and secondary winding. In both cases, the DC potential at the collector is disregarded and the AC signal swing is maintained. Such approaches are impractical in integrated circuit configurations since they both require at least two terminals on the integrated circuit substrate to interface the integrated transistors with the coil and capacitor, which must be located off the chip. The integrated circuit (IC) is reentered via a second terminal which is coupled to the base electrode of the following stage. An IC approach, which has been used, is to use a coupling resistor on the integrated circuit assembly which is coupled to the collector electrode of the selective amplifier. The $+V_{cc}$ terminal of the integrated circuit assembly provides information which can govern the DC translation of the signal from the tank terminal. The tank terminal (i.e. collector electrode) because of the inductor has a direct potential substantially equal to the magnitude of the $+V_{cc}$ supply. In the prior art, the resistor was coupled from the collector electrode or terminal 116 to the base electrode of the following stage. The junction between the resistor and the base electrode of the following stage was coupled to a constant current source which may employ a transistor with a voltage reference coupled to its base electrode.

In this manner the drop across the coupling resistor is essentially a fixed DC drop so that AC signals are translated from one direct potential, namely $+V_{cc}$ to a second fixed DC potential substantially lower than $+V_{cc}$. This technique has at least the following disadvantages. The bandwidth of the circuit is now restricted if a small constant current source and high $+V_{cc}$ potentials are necessary. This is so as the coupling resistor drives the Miller capacitances of the following stage and any collector capacitance associated with the current source. A more serious problem, results from the following situation. The selective amplifying stage, as transistor 32, employing an inductive plate load, can exhibit voltage swings above the $+V_{cc}$ supply. If an integrated coupling resistor was used, one would have to bias the boat on the substrate in which the resistor is located to a potential in excess of B+ in order to avoid the resistor from becoming forward biased and acting as a diode. A boat is a zone within the IC substrate of a predetermined type of impurity concentration for accommodating integrated circuit devices. Boats may contain impurity concentrations adapting them to accommodate transistors, diodes or resistors. To provide such a potential on the integrated substrate assembly, an additional terminal would be required.

An alternate approach would be to bias the boat by forward conduction of the resistor, which adds the capacitance from boat to substrate to the capacitance associated with the inductor. The boat to substrate capacitance has relatively low Q at high frequencies and is nonlinear at all frequencies. In any case, proper isolation of the coupling resistor on an integrated circuit assembly requires a considerable area on such an assembly to compensate for these adverse effects. The approach shown in FIG. 3 employs a zener or avalanche diode 51. Diode 51 is a PN junction formed during the same diffusion process as utilized to form the base to emitter junctions of the monolithic transistors. These diodes can now be contained in a boat biased at $+V_{cc}$, which boat is that which holds most of the integrated circuit resistors on the IC assembly. The N or cathode terminal of such a diode can swing above $+V_{cc}$ by the avalanche voltage, which is 6 to 9 volts, without losing the isolation properties afforded by the device. The DC drop across the avalanche diode 51 is relatively constant, coupled with the fact that the resistance is low to further eliminate parasitic capacitance from affecting the tank.

In the configuration shown in FIG. 3 the avalanche or zener diode 51 can be utilized in combination with resistor 52 to accommodate swings at the collector electrode of transistor 32 above $+V_{cc}$, while maintaining relatively constant DC bias voltage for transistor 50.

Transistor 50, thus biased, is arranged in an emitter follower configuration having a split emitter load for driving the chroma amplifier stage 60 and a burst amplifier stage 61. As can be seen the magnitude of the signal applied to the base electrode of the chroma amplifier 60 is slightly greater in amplitude, than the amplitude of the signal applied to the base electrode of the burst amplifier 61. This is so as the base electrode of the chroma amplifier 60, is coupled directly to the junction between emitter electrode of transister 50 and resistor 56, while the base electrode of transistor 61 is coupled to the junction between resistors 56 and 57. The arrangement shown offers the following advantages and operates as follows.

The standards for a color television transmission are such that the amplitude of the chroma signal may exceed the amplitude of the burst signal. The respective chroma and burst amplifiers must be capable of handling the maximum level of the particular signal assigned thereto without distortion. This is provided for as follows.

The DC voltage drop across the emitter resistance 62 in series with the emitter electrode of the chroma amplifier 60 is approximately equal to the DC voltage drop across resistor 56 in series with the emitter electrode of transistor 50. Resistor 62 affords negative current feedback for the chroma stage 60, while both stages 60 and 61 have a common return path through terminal 103 and resistor 63 to ground. The DC voltage at terminal 103 is relatively constant as bypassed by capacitor 64. However, the base electrode of transistor 61 is DC coupled to a lower potential point than is the base electrode of transistor 60. Accordingly, both stages 60 and 61 are biased at relatively the same levels while further having only one external output connection (terminal 103). Therefore, amplifiers 60 and 61 have a common input terminal and a common path for emitter current, permitting use of a common terminal 103 for external biasing. Such advantages are available, with the fact that the degree of signal degeneration in the chroma stage can be set, independent of the gain of the burst amplifier while maintaining both stages at a constant DC bias. Accordingly, the chroma amplifier 60 can handle larger amplitude conditions of the chroma signals, without distortion, due to the emitter degeneration afforded by resistor 62. Transistor 61 can handle the low amplitude burst signals without distortion, at a greater gain.

With the simple biasing arrangement shown, the chroma amplifier operates linearly for chroma signals, while the burst amplifier, as biased, would distort such chroma signals because of the lack of degeneration, but will operate linearly with the lower amplitude burst. The distortion which amplifier 61 may introduce during the line interval does not appear at the base electrode of transistor 60, because of the isolation provided by resistor 56.

As is known in the prior art, it is preferable to blank the chroma channel during the burst period to prevent spurious products from being developed by the demodulators because of the coupling thereto of the burst signal. Techniques to accomplish this are known in the prior art and ordinarily referred to as burst elimination or burst blanking. The chroma amplifier is preferably energized during the major portion of the line interval and is blanked during burst retrieval which occurs during the horizontal retrace interval. To accomplish this, a horizontal retrace pulse is utilized during the horizontal interval encompassing the time in which bursts are present on the back porch of the horizontal sync pulse. The horizontal pulse as applied to the base electrode of transistor 121 causes the following operations to occur. During the positive pulse, transistor 97 is turned on permitting the burst, as appearing at the base electrode of transistor 61, to be selectively amplified by transistors 61 and 97, in conjunction with the collector load comprising the parallel resonant circuit of inductor 98, capacitor 120 and damping resistor 99. The amplified burst therefore appears at terminal 111. The tank circuit further serves to remove signal components at the horizontal retrace pulse frequencies from affecting the output. Simultaneously, during the burst interval the base of transistor 65 goes positive. The base potential of transistor 65 exceeds the base potential at this point of transistor 66 by at least $2V_{be}$, due to diodes 77 and 78, coupled between the base electrode of transistor 65 and transistor 66. The diodes 77 and 78 also limit the amplitude of the keying pulse at the base of transistor 97, to prevent limiting of the collector swing. The emitter electrode of transistor 65 goes positive as does the emitter electrode of transistor 66. This assures that transistor 66 is cut off as the emitter electrode is at least one $V_{be}$ above the base electrode. Therefore there is no chroma path from the collector electrode of transistor 60 to terminal 114. The chroma channel is therefore disabled during the duration of the positive horizontal retrace pulse as applied to terminal 110.

The operation of the circuit during the line scan is as follows. The absence of the horizontal retrace pulse causes transistor 121 to be nonconducting which effectively applies ground potential to the base electrode of transistor 97. Transistor 97 is, therefore, cutoff, due to the positive potential at the emitter electrode as determined by the conduction of transistor 96 having its base electrode biased from transistor 91, resistor 92 and the zener diode 93. In this manner there is no amplification path to terminal 111 for any chrominance signals applied to the base electrode of transistor 61. In a similar manner transistor 65 is also cut off as having its base electrode effectively at ground, while its emitter electrode is at a positive potential due to the positive bias applied to the base electrode of transistor 66 via the same biasing network as described for transistor 96. Chrominance signals as applied to the base electrode of transistor 60 are amplified by transistors 60 and 66 and drive the common emitter connection of transistors 67 and 68. This enables the chroma signal to be selectively amplified at terminal 114 and coupled therefrom through zener diode 70, operating with the same design philosophy as previously described for diode 51, to the base electrode of the follower transistor 69. Amplified chrominance signals, are thereby available for application to appropriate demodulating circuitry, not shown, at terminal 115 which is coupled to the emitter electrode of transistor 69.

The collector electrode of the burst amplifier 97 is coupled to the collector electrode of transistor 125 forming part of the chroma oscillator circuit. Basically, the oscillator circuit consists of an amplifier stage, a limiting stage and a filter network. The amplifier stage is formed by transistors 126, 127 and 128 and the resistors 136, 138, 139, 140 and 141. The amplifier is DC stabilized by means of the feedback resistor 141 coupled between the emitter electrode of transistor 126 and the base electrode of transistor 127. This DC feedback permits the oscillator to operate relatively insensitive to supply and temperature variations.

The limited amplifier stage includes the transistor 125 and the external resistor 146 and capacitor 145 connected to terminal 109.

At the operating frequency of the oscillator, determined primarily by the crystal 128, capacitor 145 bypasses the resistor 146, and transistor 125 functions as an ordinary common emitter amplifier for small signals to assure the start of oscillations. Signal increases serve to charge the capacitor 145, and the DC potential at the emitter electrode of transistor 125 increases tending to back or reverse bias transistor 125. As the emitter voltage increases the gain of transistor 125 decreases. The limiter transistor stage 125 therefore provides limiting action when the oscillator signal reaches a predetermined level. This level which, in turn, specifies the peak to peak output of the oscillator is controlled by the setting of the variable resistor 146.

Capacitor 145 is selected so that the time constant of resistor 146 and capacitor 145 is of the order of magnitude of one to several cycles of the oscillator signal. The filter network which couples the output of the limiter stage at terminal 111 and the input of the amplifier at terminal 107 is a resonant circuit tuned to the chroma subcarrier frequency and provides AC feedback of a phase and amplitude to ensure oscillations. The circuit includes the inductor 98, capacitor 120 and resistor 99 forming part of the collector network of transistor 125. Crystal 128 in series with the adjustable capacitor 129 primarily determine the exact resonant frequency and are coupled in series between terminals 111 and 107.

The high Q crystal 128 is selected to resonate close to the chroma subcarrier frequency. The exact resonant frequency is adjusted by means of the variable capacitor 129. The input impedance of the amplifier seen looking into the base of transistor 127 is very low (i.e. about 50 ohms), due to the AC feedback ratio. Therefore, the amplifier has very little effect on the operating frequency and damping characteristics of the circuit. Transistor 127 serves to drive the transistor amplifier 128, having a gain determined by the collector load 136. Transistors 127 and 128 provide a beta-multiplication amplifier to afford low current base operation, thereby making the DC at the oscillator output terminal 108 essentially beta independent. This independent DC level serves as a DC reference for the terminal 109 connected to the emitter electrode of transistor 125. The parallel resonant circuit comprising inductor 98, resistor 99 and capacitor 120 is selected to resonate at about 3.0 MHz. These components are selected so as to provide the required bandwidth and phase response for the burst locked oscillator. The oscillator, is an injection locked type and thereby provides an output which is synchronized to the amplified burst signal appearing at terminal 111 and applied to the oscillator through the crystal 128 and capacitor 129.

An important characteristic of an injection-locked oscillator is the ability to respond properly to the applied burst signal. In the oscillator circuit described, the quiescent oscillator signal at the emitter of transistor 126 is set to approximately 1½ volts peak to peak by adjusting resistor 146 which, as indicated, sets the limit of the amplitude of the oscillations. Under such conditions a 3 volt peak to peak burst signal applied to the crystal 128 at terminal 111 increases the signal at the emitter electrode of transistor 126 to approximately 4.0 volts peak to peak. This magnitude of change in amplitude (i.e. almost a three times change) enables the color killer circuit to operate reliably, while further permitting the amplifier associated with the oscillator to function within its linear dynamic range.

The amplitude of the oscillator during the presence of burst is a function of burst. Killer detection is provided by the transistor 125 in conjunction with resistor 146 and capacitor 145 which operates as an average detector. The operation of the killer circuit is as follows.

As previously mentioned there can be as much as three to one increase in amplitude of the oscillator signal for a color transmission as compared to a monochrome transmission. In this manner the larger DC voltage produced across capacitor 145 during a color transmission forward biases transistor 147 which in turn forward biases transistor 149 via resistor 150. Further filtering of the chroma subcarrier frequency is provided by resistor 150 and capacitor 151. Capacitor 151 provides a larger time constant to integrate fluctuations of DC at terminal 109. The potential at the collector electrode of transistor 47 is therefore relatively low, and hence transistor 90 is cut off during the presence of burst. If, as during a monochrome transmission, there is a loss of burst, the voltage across capacitor 151 is no longer sufficient to turn on transistor 47 via transistor 149, and therefore causes transistor 90 to saturate. This action disables the operation of the chroma amplifier stage by cutting off transistors 75 and 67. The combination of transistors 90 and 47 function as a killer switch for reliable operation for the presence or absence of burst. The color killer circuit, as described, is relatively noise immune as the average detector comprising the base to emitter junction of transistor 125, resistor 146 and capacitor 145, averages out any random amplitude fluctuations of the oscillator signal due to noise, as further bandwidth limited by the crystal filter 128. Therefore such random noise fluctuations average out to zero across capacitor 151 as well. The resultant noise immunity assures reliable killer operation.

An ACC control loop is provided separate from the color killer detection circuitry, just described, and operates according to the principles described in conjunction with FIG. 2.

By way of example only a table of values is presented below for various on-chip components of the circuitry of FIGS. 2 and 3 and the various off-chip components of the cooperating circuitry illustrated in those figures.

TABLE A—ON-CHIP COMPONENTS

| | |
|---|---|
| Resistors | |
| 23 | 5,000 ohms |
| 31 | 1,500 ohms |
| 37 | 5,000 ohms |
| 40 | 5,000 ohms |
| 43 | 2,000 ohms |
| 46 | 5,000 ohms |
| 52 | 1,800 ohms |
| 53 | 8,200 ohms |
| 56 | 500 ohms |
| 57 | 5,000 ohms |
| 62 | 100 ohms |
| 71 | 10,000 ohms |
| 76 | 5,000 ohms |
| 89 | 4,000 ohms |
| 92 | 5,000 ohms |
| 94 | 9,000 ohms |
| 95 | 50 ohms |
| 100 | 2,000 ohms |
| 122 | 400 ohms |
| 123 | 4,000 ohms |
| 135 | 5,000 ohms |
| 136 | 5,000 ohms |
| 137 | 400 ohms |
| 138 | 820 ohms |
| 139 | 270 ohms |
| 140 | 1,000 ohms |
| 141 | 820 ohms |
| 142 | 500 ohms |
| 148 | 5,000 ohms |
| 150 | 5,000 ohms |
| 152 | 1,300 ohms |
| 153 | 1,000 ohms |
| 158 | 500 ohms |

TABLE B—OFF-CHIP COMPONENTS VALUES

| | |
|---|---|
| Capacitors | |
| 35 | 60 micromicrofarads |
| 64 | 0.05 microfarads |
| 73 | 70 micromicrofarads |
| 85 | 0.01 microfarads |
| 120 | 75 micromicrofarads |
| 129 | 5–20 micromicrofarads (variable) |
| 131 | 8.2 micromicrofarads |
| 132 | 30 micromicrofarads |
| 145 | 5–15 micromicrofarads (variable) |
| 151 | 100 microfarads |
| 157 | 100 microfarads |
| Resistors | |
| 63 | 270 ohms |
| 86 | 200 ohms |
| 87 | 0–10K ohms (variable) |
| 99 | 1,000 ohms |
| 146 | 0–40 Kilohms (variable) |
| 156 | 18,000 ohms |
| Inductors | |
| 34 | Selected with C35 to resonate at 3.08 MHz. (approximately) |
| 72 | Selected with C73 to resonate at 4.08 MHz. (approximately) |
| 98 | Selected with C120 to resonate at 3.0 MHz. (approximately) |
| 130 | Mutually coupled with inductor 98 |
| Crystal | |
| 128 | 3.58 MHz. unit |

A "Q" damping resistor of 10,000 ohms may be placed in shunt with C34 and L35; while a 2,400-ohm resistor may be placed across C73 and L72.

The above values for components, by way of example, are representative of the chroma processing chip circuitry, which monolithic integrated circuit utilizes transistor configurations which may have beta variations of 40 to 200 times. Typical tolerances for the monolithic zener diodes are ±0.25 volt. The above on-chip resistor components may have absolute value variations of ±25 percent; whereas the ratios between resistors may vary by only ±3 percent. Together with such tolerances, the circuitry performs as indicated with a $+V_{cc}$ potential nominally at 11.2 volts.

What is claimed is:

1. In a color television receiver of the type employing a circuit for responding to and selecting from a composite television signal an oscillatory burst signal representative of a chroma subcarrier signal and transmitted with said composite signal during a color television transmission, in combination therewith comprising:

a. A filter network having a relatively narrow frequency response characteristic permitting propagation therethrough of signal frequencies including noise components about said chroma subcarrier frequency, said filter network having an input terminal coupled to said circuit, and an output terminal for providing thereat a filtered signal;

b. an oscillator circuit, including said filter network disposed in an AC feedback path of said oscillator for determining the frequency of oscillations, said oscillator providing an output signal whose magnitude varies in accordance with said magnitude of said filtered frequency signal components, c. detector circuit means having an input responsive to said varying magnitude oscillator signal for providing at an output thereof a control voltage in accordance with the peak amplitude of said oscillator signal, including any such peaks as produced by said noise components, d. a gain controllable amplifier responsive to said composite signal for providing at an output thereof a predetermined band of frequency components, including said oscillatory burst frequency signal, determinative of color information present in said composite signal, and e. means coupling said detector circuit means to said amplifier for controlling the gain thereof in accordance with the magnitude of said control voltage.

2. The color television receiver according to claim 1 wherein said filter network comprises, a. a crystal having a center frequency in the vicinity of said chrominance subcarrier frequency and, b. a variable capacitor in series with said crystal for adjusting the exact center frequency of said filter about said chrominance subcarrier frequency, whereby said frequency as adjusted determines the frequency of said oscillations.

3. Automatic chroma control apparatus for a television receiver comprising, a. a gain controllable amplifier responsive to chrominance frequency signal components transmitted with a composite television signal, to provide at an output thereof a predetermined band of chrominance frequency components, including an oscillatory burst frequency signal transmitted with said composite signal, determinative of color informations, b. first means responsive to said composite signal for selectively providing at an output thereof an amplified version of said oscillatory burst signal, c. an oscillator circuit, including a crystal filter coupled between an input and output terminal thereof, for providing AC feedback to said oscillator for determining the frequency of oscillations, said input terminal coupled to said first means for applying to said oscillator said oscillatory burst signal and any other signal frequencies including noise components, within the band-pass determined by said crystal, for locking said oscillator in phase and frequency to said burst signal, said oscillator providing an output signal whose magnitude varies in accordance with said magnitude of said crystal filtered frequency signal components, d. detector circuit means having an input responsive to said varying magnitude oscillator signal for providing at an output thereof a control voltage in accordance with the peak amplitude of said oscillator signal, including any such peaks as produced by said noise components, e. means coupling said detector circuit means to said amplifier for controlling the gain thereof in accordance with the magnitude of said control voltage.

4. The automatic control apparatus according to claim 3 wherein said detector circuit means, comprises, a. a transistor having a base, collector and emitter electrode, b. means for applying said output signal of said oscillator to said base electrode, c. a capacitor and a resistor coupling said emitter electrode to a point of reference potential, and selected to provide an RC time constant for operating with said base to emitter junction of said transistor at said oscillator frequency in a peak detecting circuit, and d. means coupled to said collector electrode for applying a source of operating potential thereto.

5. Chroma processing circuitry for use in a color television receiver for responding to chrominance information signal components contained in a composite video signal provided by said receiver during a color transmission, comprising, a. a gain-controllable chroma amplifier, including a first resonant circuit, of a first band-pass characteristic to permit selective amplification of said chrominance information signal components, when said composite signal if applied to said amplifier, b. gain determining biasing means coupled to said amplifier for providing a reference biasing level thereto, determining a first gain condition of said amplifier, c. a burst amplifier including a second resonant circuit having a second band-pass characteristic, coupled to said gain controllable chroma amplifier for providing at an output an oscillatory burst signal contained in said chrominance information signals during a color transmission, d. an oscillator having an output terminal coupled to said burst amplifier and an input terminal, e. a narrow band crystal filter coupled between the output and input terminal of said oscillator for providing a given amplitude AC feedback signal for said oscillator sufficient to sustain oscillations, while permitting said burst amplifier output signal as developed at said output terminal to couple to said input terminal to lock said oscillator and vary the oscillator signal amplitude in accordance with the signals coupling through said crystal filter, f. a peak detector, including a resistor, capacitor time constant network, having an input responsive to said varying amplitude oscillator signal, for providing at an output terminal a control voltage proportional to the highest peak value of said oscillator signal, g. means coupling said output terminal of said peak detector to said gain determining baising means for varying said reference biasing level and therefore said chroma amplifier gain in accordance with said amplitude variation of said oscillator signal.

6. Chroma processing circuitry for use in a color television receiver, for responding to chrominance information signal components transmitted with a composite signal during a color transmission, comprising, 1. a monolithic integrated circuit chip having a plurality of chip terminals disposed about a periphery thereof, said chip including:

a. a chroma amplifier section having first, second and third amplifying stages, including a direct coupling path therebetween, said first and third stages having a first and second output terminal, said first output terminal coupled to a first one of said chip terminals, and said second output terminal coupled to a second one of said chip terminals, b. a burst amplifier stage directly coupled to said second stage of said chroma amplifier circuit and having an output terminal coupled to a third one of said chip terminals, c. an oscillator circuit having an input and output terminal, said oscillator output terminal coupled to said burst amplifier stage at said third one of said chip terminals, and having said input terminal coupled to a fourth one of said chip terminals, d. an automatic chroma control peak detector circuit, having an input terminal coupled to said oscillator input terminal, and having an output terminal coupled to an input terminal of said first chroma amplifier stage, said peak detector further having a second output terminal coupled to a fifth one of said chip terminals;

2. a first off-chip, tuned circuit having a first given band-pass characteristic within said range of said chrominance information signal components, coupled to said first chip terminal, for providing chrominance selectivity for said first chroma stage, 3. a second off-chip tuned circuit having a second given band-pass characteristic within said range coupled to said second chip terminal for providing chrominance selectivity for said third chroma stage, 4. a third off-chip, tuned circuit having a third given band-pass characteristic, relatively wider than said first and second band-pass characteristic within said range and coupled to said third one of said chip terminals for providing selectivity for said burst amplifier, 5. an off-chip filter network, comprising a crystal in series with a variable capacitor, coupled between said third and said fourth terminals for sustaining oscillations in said oscillator circuit while providing a narrow band-pass to said burst signal as selectively amplified by said burst amplifier, said feedback voltage due to said filter network being relatively small compared to the magnitude of said burst signal applied thereto, to cause said oscillator to vary in amplitude in accordance with signals at said third terminal within the band-pass of said crystal, 6. an off-chip time constant network comprising a capacitor in shunt with a resistor coupled to said fifth one of said chip terminals to operate said peak detector at said chrominance subcarrier frequency, to develop a voltage across said capacitor in accordance with said varying amplitude oscillator signal.

7. The chroma processing circuitry according to claim 6 wherein a direct coupling path between said first chroma stage and said second chroma stage comprises, a. an avalanche diode mounted on said chip and coupled between said first output terminal, coupled to said first off-chip tuned circuit, and an on-chip input terminal of said second chroma amplifying stage.

8. Automatic chroma control circuitry for use in a color television receiver, capable of responding to and processing a transmitted signal having color information components contained therein for providing therefrom a composite video signal including said color information components and an oscillatory burst signal together with undesired noise components of a random nature, comprising, a. a filter network having a relatively narrow frequency response characteristic sufficient to permit propagation therethrough of signal frequencies including said noise components about a predetermined color subcarrier frequency, said filter having an input terminal responsive to said composite video signal, and an output terminal for providing narrow band color information frequency signals consisting of the oscillatory burst signal and the undesired noise components.

b. oscillator circuit means including said filter network coupled between an input and output terminal for providing AC feedback to said oscillator means for determining the frequency of oscillations, said oscillator providing an output signal whose magnitude varies in accordance with the magnitude of said filtered frequency signal components as permitted to propagate through said filter network including said noise components, c. a peak detector circuit having an input responsive to said varying magnitude oscillator signal for providing at an output thereof a control voltage in accordance with the peak amplitude of said oscillator signal which may include any such peaks as produced by said noise components, d. a gain controllable amplifier responsive to said composite signal for providing at an output thereof a predetermined band of frequency components determinative of said color information present in said composite signal, and e. means coupling said detector circuit to said amplifier for controlling the gain thereof in accordance with the magnitude of said control voltage according to said varying amplitude oscillator signal whereby the gain as controlled may be substantially equal for low amplitude color information signals and high amplitude noise components, as that gain for low amplitude noise components and high amplitude color information signals.

9. The automatic chroma control circuitry according to claim 8 further comprising, a. means coupled to said oscillator circuit for varying the quiescent peak-to-peak voltage swing of said output signal, to provide a reference level for said peak detector circuit.

10. Chroma processing circuitry for use in a color television receiver for responding to chrominance information signal components contained in a composite video signal provided by said receiver during a color transmission, comprising, a. an integrated circuit totem pole amplifier including first and second monolithic transistors deposited on a substrate, each having a base, collector and emitter electrode, said collector electrode of said first transistor coupled to said emitter electrode of said second transistor, said collector electrode of said second transistor coupled to a first terminal on said substrate, and said base electrode of said first transistor coupled to a second terminal on said substrate, for application of a video signal to said second terminal, b. an off-substrate parallel resonant circuit having a first band-pass characteristic within said chrominance information range coupled to said first terminal on said substrate for providing chrominance selectivity for said totem pole amplifier, c. an integrated circuit biasing network including a third monolithic follower transistor configuration mounted on said substrate and having a base electrode, including means coupled thereto for operating said follower stage at a voltage reference level, said emitter electrode of said monolithic follower transistor being resistively coupled to said base electrode of said second transistor for supplying an operating bias current thereto, d. a burst amplifier including a fourth monolithic transistor mounted on said substrate having a base electrode coupled to said collector electrode of said second transistor for applying said chrominance information components thereto, and a collector electrode coupled to a third terminal on said substrate, e. a second off-substrate parallel resonant circuit having a wider band-pass characteristic than said first within said range coupled to said third terminal for providing selectively for said burst amplifier about said chrominance subcarrier frequency, f. oscillator circuit means, included on said substrate, having an output terminal coupled to said third terminal and an input terminal coupled to a fourth terminal on said substrate, g. an off-substrate narrow band filter network, including, a crystal coupled between said third and fourth terminals for providing a given amplitude AC feedback signal for said oscillator circuit means, sufficient to sustain oscillations, while permitting said burst amplifier output signal as developed at said third terminal to vary the oscillator signal amplitude in accordance with the signal applied through said crystal to said oscillator input terminal, h. a fifth monolithic transistor arranged in a follower configuration and having a base electrode directly connected to an on-substrate terminal of said oscillator, and having an emitter electrode coupled to a fifth terminal on said substrate, i. an off-substrate RC network coupled to said fifth terminal, having a time constant associated therewith to operate said base to emitter junction of said fifth monolithic transistor in a peak detector circuit, to cause said capacitor to charge to a peak voltage value of a magnitude in accordance with said varying oscillator amplitude, and j. means including a sixth monolithic transistor, on said substrate having a base electrode coupled to said fifth terminal and a collector electrode coupled between said base electrode of said second transistor and said resistively coupled emitter electrode of said third monolithic follower transistor to bypass a portion of said base operating biasing current as supplied to said second transistor in accordance with said peak voltage value developed across said capacitor.